United States Patent [19]

Seebinger

[11] 4,325,529
[45] Apr. 20, 1982

[54] MOUNTING BRACKET ASSEMBLY

[75] Inventor: Frederick L. Seebinger, Kinnelon, N.J.

[73] Assignee: American Trading and Production Corp., Pine Brook, N.J.

[21] Appl. No.: 143,951

[22] Filed: Apr. 25, 1980

[51] Int. Cl.³ .............................................. A47F 5/00
[52] U.S. Cl. ................................... 248/298; 248/219.4
[58] Field of Search ............ 248/298, 674, 231, 219.4, 248/230, 299; 211/107, 110; 52/40

[56] References Cited

U.S. PATENT DOCUMENTS

| 461,373 | 10/1891 | Snell | 248/298 X |
|---|---|---|---|
| 575,717 | 1/1897 | Homan | 248/299 X |
| 2,512,636 | 6/1950 | Flynt | 248/299 UX |
| 2,729,414 | 1/1956 | Clark | 248/298 X |
| 3,650,503 | 3/1972 | Seidel | 248/299 X |
| 3,704,675 | 12/1972 | Bellasalma | 248/222.2 X |

Primary Examiner—J. Franklin Foss
Attorney, Agent, or Firm—Blum, Kaplan, Friedman, Silberman and Beran

[57] ABSTRACT

A U-shaped bracket element pivotably attached to an object to be mounted is retained on a fixed base. Prior to clamping the bracket against the base, the U-shaped bracket element is rotated relative to the base about an axis perpendicular to the pivoting axis of the object to be mounted. Vertical and lateral adjustments are made while the fixed base supports the weight of the object.

2 Claims, 11 Drawing Figures

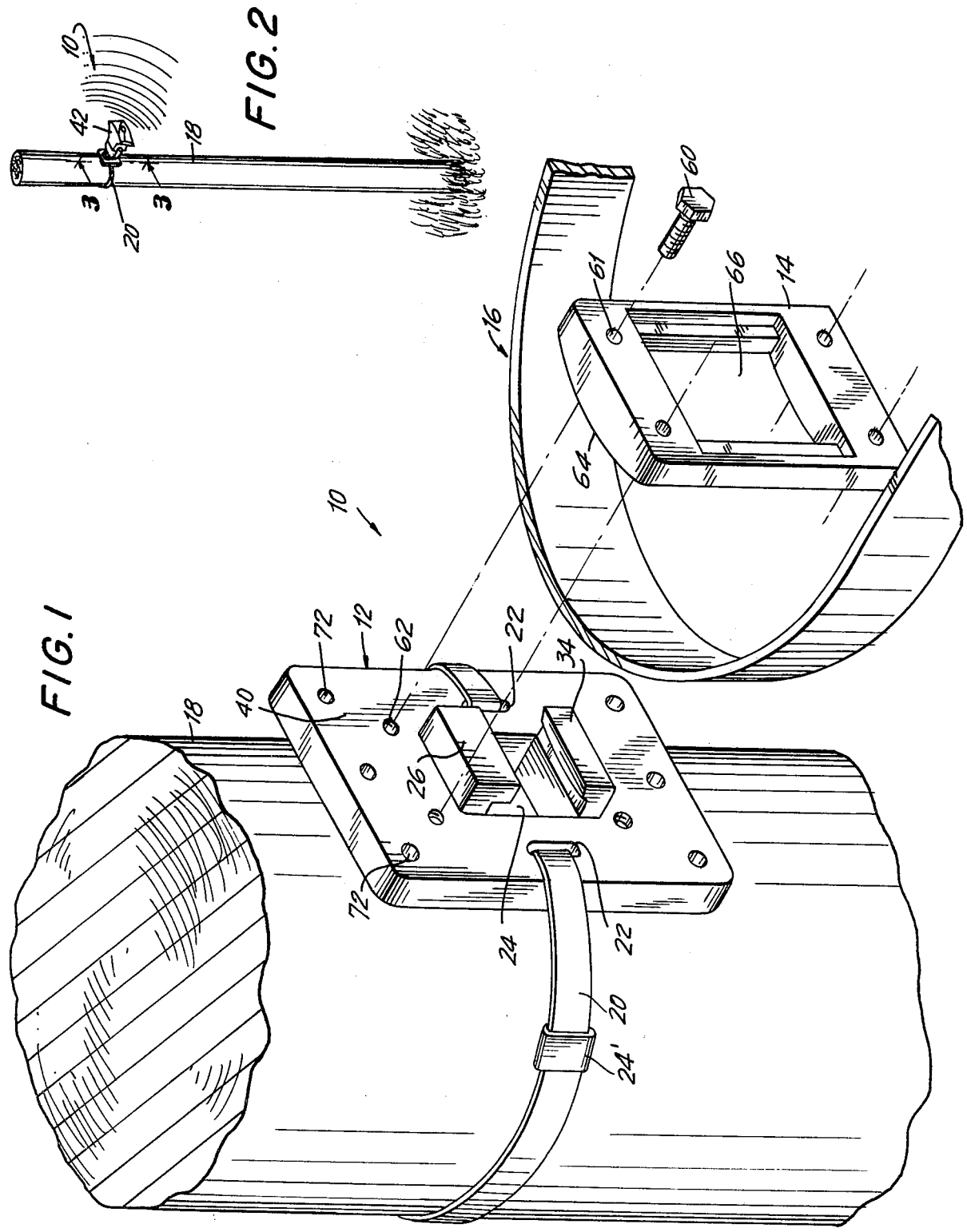

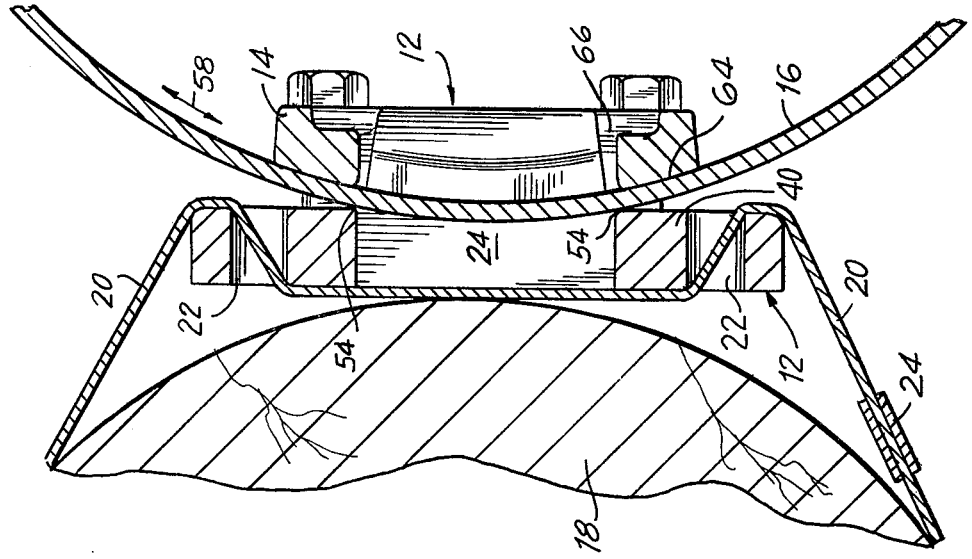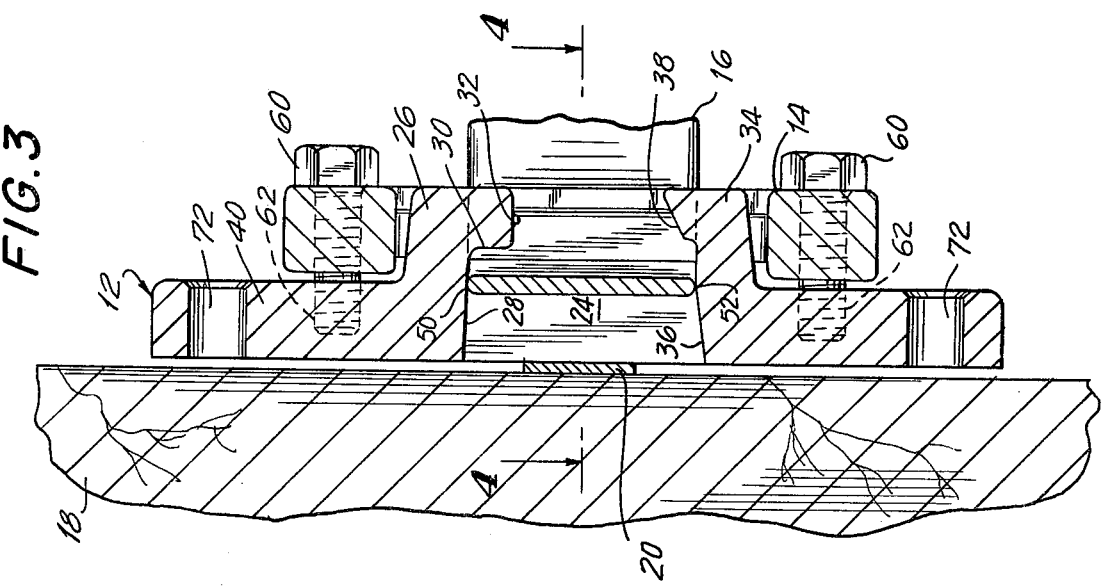

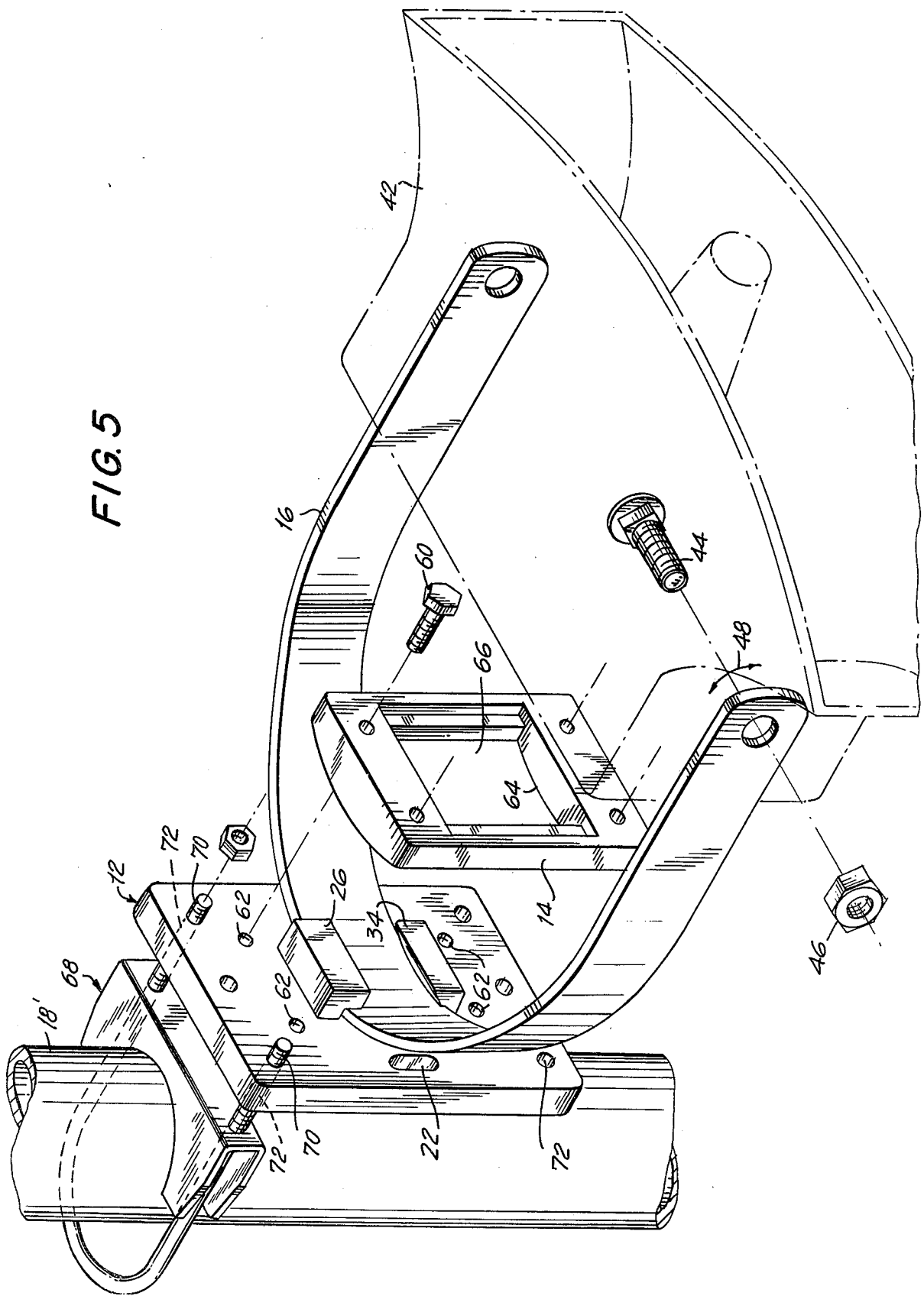

MOUNTING BRACKET ASSEMBLY

BACKGROUND OF THE INVENTION

This invention relates generally to a mounting bracket assembly of the type used to support objects such as loudspeakers, spotlights, and the like at elevated positions and more particularly to a mounting bracket assembly which permits horizontal and vertical adjustment of the mounted object, after the weight of the object is supportd by the mounting bracket assembly. One of the problems in mounting large loudspeaker horns, or lighting fixtures is that they are frequently placed high on a pole or a building wall. The speaker horn or lighting fixture is often heavy and in using prior art brackets the aiming and holding functions are simultaneously perfected by tightening the securing bolts. Until the bolts or other fastener devices are put in the locked position, the installer must simultaneously support the weight of the object while attempting to adjust the aim of the speaker or lighting fixture. This is extremely awkward and can in some instances present hazards of injury both to personnel and to the equipment.

What is needed is a mounting bracket assembly for objects to be mounted in remote positions such as on walls of buildings or on poles which permits adjustments in the position of the mounted object while the bracket assembly supports the weight of the object. It is also desirable that the weight of the object be transferred simply from the person performing the installation to the mounting bracket assembly.

SUMMARY OF THE INVENTION

Generally speaking, in accordance with the invention, a mounting bracket assembly especially suitable for mounting and adjusting the position of objects in remote places such as on poles or high on the wall of a building is provided. A U-shaped bracket element pivotably attached to an object to be mounted is retained on a fixed base. Prior to clamping the bracket to the base, the U-shaped bracket element is rotated relative to the base about an axis perpendicular to the pivoting axis of the object to be mounted. Vertical and lateral adjustments are made while the weight of the object is supported by the fixed base. A hooked portion of the base constrains the U shaped bracket until fastening is completed.

Accordingly, it is an object of this invention to provide an improved mounting bracket assembly which allows for vertical and horizontal adjustment of an object to be mounted.

Another object of this invention is to provide an improved mounting bracket assembly which supports the weight of the object to be mounted while adjustments in position are made prior to final clamping.

A further object of this invention is to provide an improved mounting bracket assembly which is suited for mounting in remote positions such as on walls of buildings and on poles.

Still another object of this invention is to provide an improved mounting bracket assembly which is simple to use and minimizes the potential for damage to personnel and equipment.

Still other objects and advantages of the invention will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded view in perspective, partially fragmented of a mounting bracket assembly in accordance with this invention;

FIG. 2 is a perspective view of the mounting bracket assembly of FIG. 1 mounted on a pole;

FIG. 3 is a sectional view taken along the line 3—3 of FIG. 2;

FIG. 4 is a sectional view taken along the line 4—4 of FIG. 3;

FIG. 5 is a view similar to FIG. 1 showing a clamp mounting for the bracket assembly;

DESCRIPTION OF THE PREFERRED EMBODIMENTS

Figure 6:
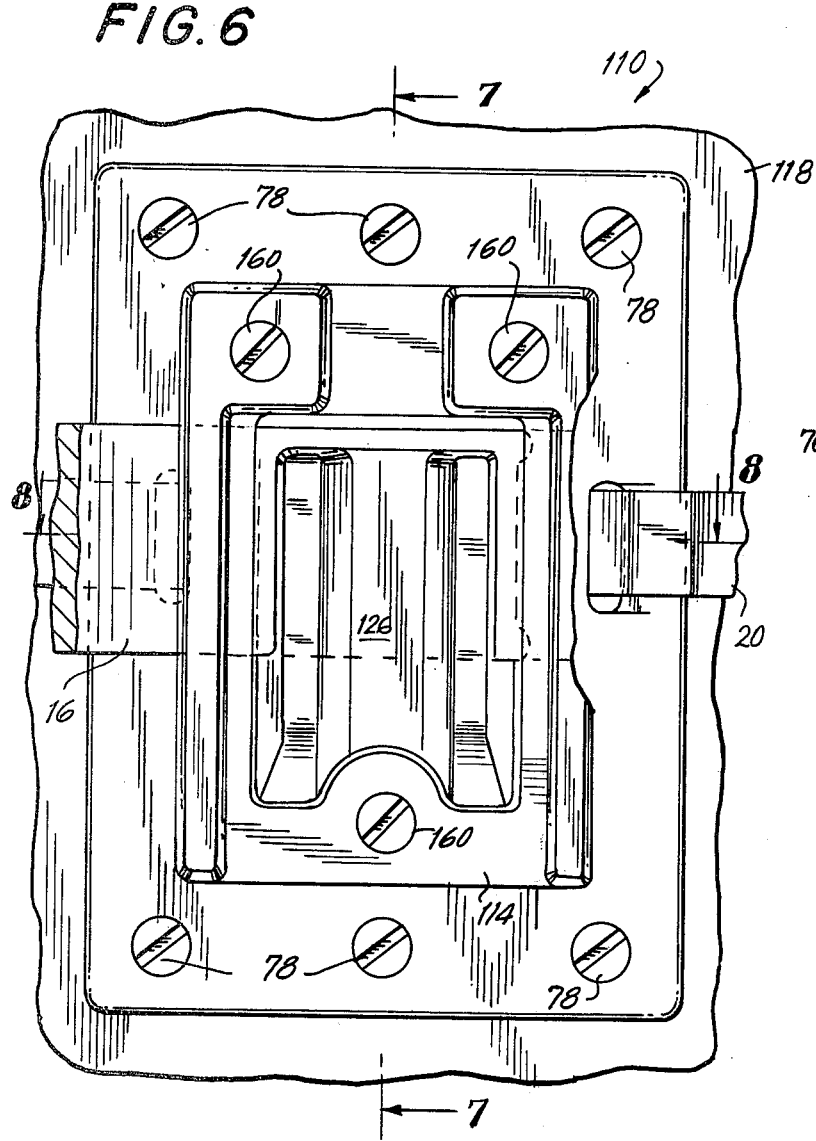
FIG. 6 is a front elevational view of an alternative embodiment of a mounting bracket assembly in accordance with this invention.

With reference to the FIGS. 1-5, a mounting bracket assembly 10 in accordance with this invention includes a base 12, a clamp plate 14, and a U shaped bracket element 16. In this embodiment the base 12 is attached to a vertical pole 18 by means of a metal strap 20 which passes through slits 22 in the base 12 and around the pole 18 prior to be joined by a clamp 24' in the conventional manner. Tension in the strap 20 holds the base 12 permanently in its selected vertical position along the pole 18. Thus, the base 12 is mounted to the pole 18 independently of the remainder of the mounting bracket assembly 10 and without any difficulties which might otherwise be induced if the object to be mounted were already attached. As seen in FIGS. 3 and 4, the strap 20 is positioned between the pole 18 and the base 12. A rectangular opening 24 is substantially centered on the base 12 and is described more fully hereinafter.

A hook element 26 extends outwardly from the upper side 28 of the opening 24 turning downwardly to partially obstruct the entrance to the opening 24. The inner surface 30 of the hook element 26 is substantially perpendicular to the upper side surface 28 of the opening 24. The lower surface 32 of the hook element 26 is substantially perpendicular to the inner surface 30.

A second hook element 34 extends from the lower side surface 36 of the opening 24 and partially obstructs the entrance to the opening 24. The upper surface 38 of the lower hook element 34 is sloped such that the distance between the surfaces 32, 38 increases as penetration is made into the opening 24 toward the pole 18.

The upper hook element 26 and the lower hook element 34 are integral parts of the base 12 which is fabricated of a rigid material suitable to carry the load presented by the supported object. For use with heavy objects, the base is fabricated of metal, for example, steel and for a lighter object the base may be fabricated of plastic. As best seen in FIGS. 1 and 3, the hook elements 26, 34 in combination with the flat plate portion 40 of the base 12 provide a C shaped slot.

In the FIGS. 2 and 5, for the sake of an example, the mounting bracket assembly 10 in accordance with this invention is illustrated as supporting a horn type loudspeaker 42. The speaker 42 is positioned between the tines of the U shaped bracket element 16 and is held in position by bolts and nuts 44, 46. The loudspeaker 42 may be pivoted about the bolts 44 as indicated by the arrow 48 to aim the beam of sound from the speaker 42 in any vertical direction relative to the pole 18. Thus the sound can be directed upwardly or downwardly before the nuts 46 and bolts 44 are tightened.

The rounded portion of the U shaped bracket element 16 fits within the C shaped slot formed by the upper hook element 26, the lower hook element 34, and the flat plate portion 40 of the base 12. As stated above, the hook elements 26, 34 partially obstruct entrance to the opening 24, however, the U shaped bracket element 16 is inserted behind the hook elements 26, 34 by tilting the bracket element 16 and placing the upper edge 50 of the bracket element 16 within the opening 24 behind the vertical surface 30 of the upper hook element 26. Then, by rotating the U shaped bracket element 16 slightly in the clockwise direction (FIG. 3) the lower edge 52 of the bracket 16 slides over the sloped upper surface 38 of the lower hook element 34 and passes into the opening 24. Then, the weight of the bracket 16 and the supported object 42 providing a clockwise moment lock the U shaped bracket element 16 within the C shaped slot. The vertically oriented corners 54 (FIG. 4) of the opening 24 prevent the U shaped bracket element 16 from rotation once in position. In this condition, as indicated in FIG. 4, the rounded portion of the U shaped bracket element 16 is free to slide, as indicated by the arrow 58, in both directions through the C shaped slot.

The bracket 16 and any object attached thereto is now joined to the pole 18 by means of the base 12 and needs no additional support by any person when in this condition. Thus adjustments can be made in the direction of sound output from the speaker 42 in the horizontal directions 58 or in the vertical directions 48 resulting from tilting.

When the desired position has been selected for direction of the sound beam in both the vertical and horizontal direction, the clamp plate 14 is rigidly attached to the base 12 by means of bolts 60 which pass through clearance holes in the clamp 14 and seat in threaded holes 62 in the base 12. The inner convex surfaces 64 of the clamp plate 14 are curved with a radius corresponding to the curvature of the U shaped bracket element 16 and a central opening 66 in the clamp plate 14 avoids contact with the protruding hook elements 26, 34. When the bolts 60 are tightened, the clamp plate 14 presses in the U shaped bracket 16 against the vertical corners 54 of the opening 24 in the base 12 and the U shaped bracket 16 is no longer able to move in the directions indicated by the arrow 58.

As seen in FIG. 4, the curvature of the U shaped bracket element 16 extends into the opening 24 of the base 12 without any interference. Also, it should be noted that the upper surface 28 and the lower surface 36 of the opening 24 diverge in the direction of the pole 18. This facilitates insertion and seating of the U-shaped bracket element 16 in the C-shaped slot as described above.

In FIG. 5 the base 12 is shown attached to a pipe 18' using a conventional U bolt clamp 68 having its threaded ends 70 extending through clearance holes 72 in the base 12. Either the band 20 mounting shown in FIG. 1 or the U bolt clamp 68 of FIG. 5 is selected in accordance with the surface condition and diameter of the vertical support member 18, 18'.

Figure 7:
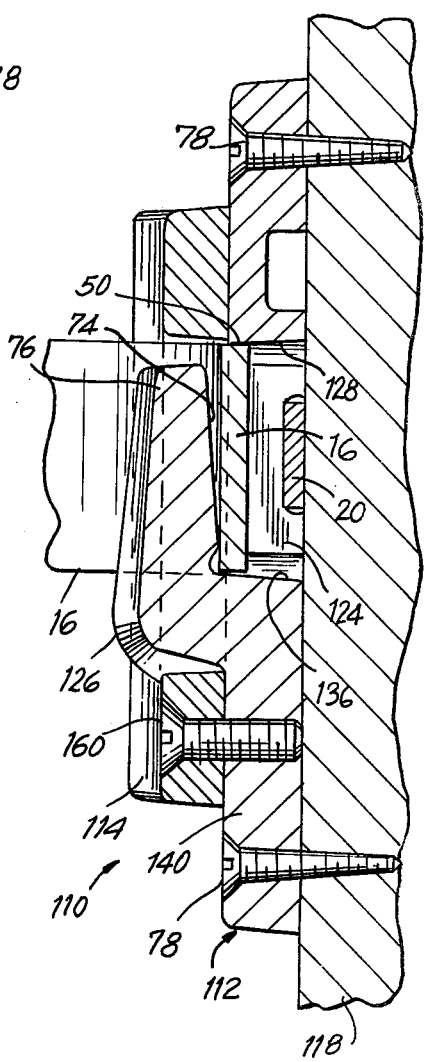
FIG. 7 is a sectional view taken along the line 7—7 of FIG. 6.
Figure 8:
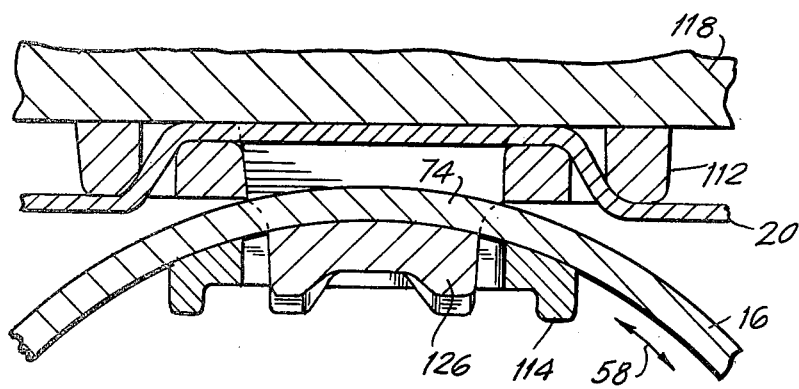
FIG. 8 is a sectional view taken along the line 8—8 of FIG. 7.

With reference to FIGS. 6-8, an alternative embodiment of a mounting bracket assembly 110 in accordance with this invention is described. Similar parts have the same reference numerals in FIGS. 1-5 and FIGS. 6-8. A base 112 has a substantially rectangular central opening 124. A single hook element 126, integral with the flat plate portion 140 of the base 112, substantially obstructs direct access to the opening 124. The inner surface 74 of the hook element 126 is curved and slopes away from the supporting structure with the free end 76 of the hook element 126 being farthest from the support structure 118. The U-shaped bracket element 16 slips vertically downward behing the hook element 126 and when resting on the bottom surface 136 of the opening 124, the U-shaped bracket element 16 is constrained by the base 112.

Adjustment can then be made freely in the directions as indicated by the arrow 58 (FIG. 8) and at the free ends of the U-shaped bracket 16 in the directions as indicated by the arrow 48 of FIG. 5. After adjustments are made to the position of the loudspeaker 42 or other supported object, the U-shaped bracket element 16 is fixed in position by attachment of a clamp plate 114 by means of machine screws 160 which pass through clearance holes in the clamp plate 114 and threadably engage in the flat plate portion 140 of the base 112. As seen in FIG. 8, the surface of the clamp plate 114 which contacts the U-shaped bracket element 16 is curved for a close fit. Also, it should be noted in FIG. 7, that tightening of the clamp plate 114 in place forces the U-shaped bracket element 16 into a substantially vertical condition with its upper edge 50 being constrained vertically by the upper surface 128 of the opening 124. Accordingly, the U-shaped bracket element 16 is constrained in every direction.

In the alternative embodiment of FIGS. 6-8, the mounting bracket assembly 110 in accordance with this invention is illustrated as being attached to the support structure 118 by both a metal band or strap 20 as described above and by means of screws 78 which pass through the base 112 and engage the supporting structure 118. The supporting structure 118 provides a flat surface, as an example, a wall or a rectangular post, whereon the strap 20 and the screws 78 are useable.

Figure 9:
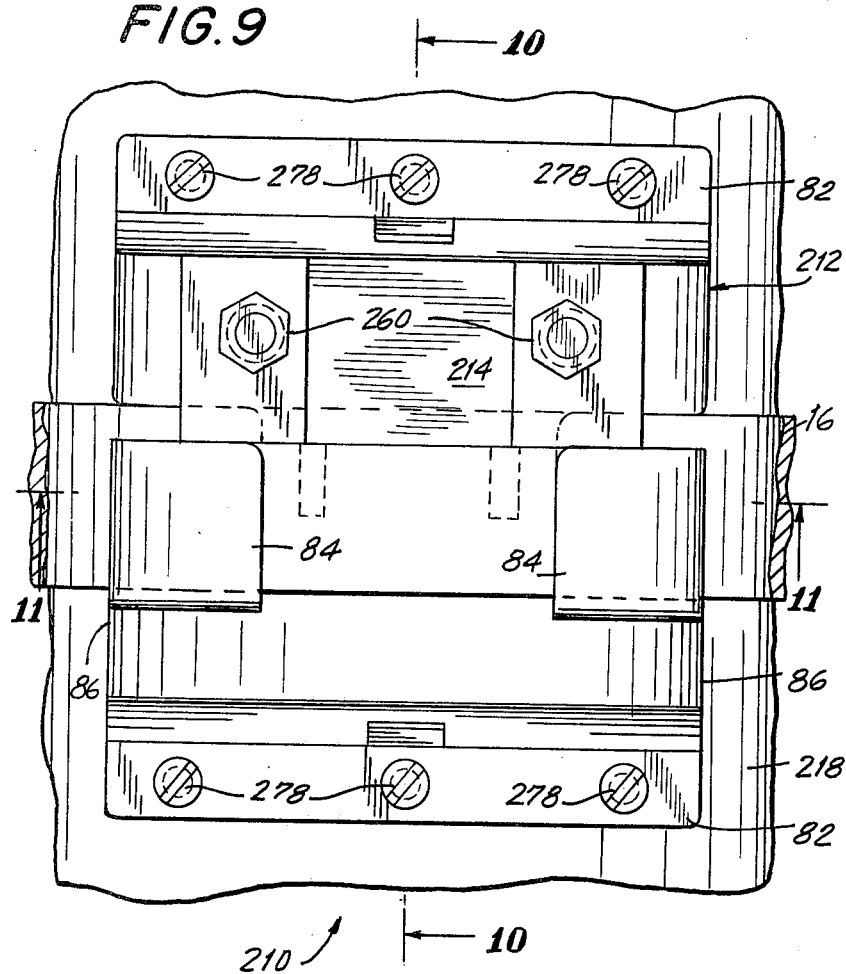
FIG. 9 is a front elevational view of another alternative embodiment of a mounting bracket assembly in accordance with this invention.
Figure 10:
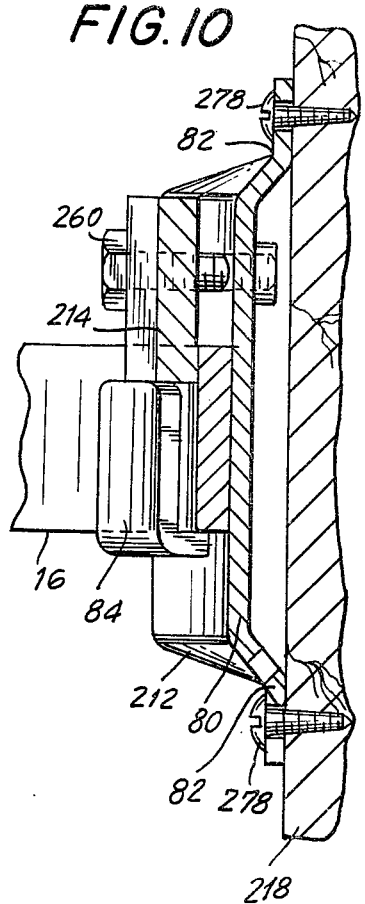
FIG. 10 is a view taken along the line 10—10 of FIG. 9.
Figure 11:
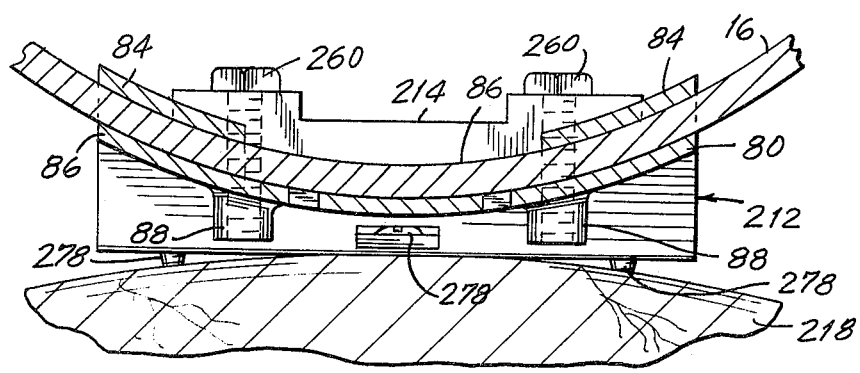
FIG. 11 is a sectional view taken along the line 11—11 of FIG. 9.

Another altaernative embodiment 210 of a mounting bracket assembly in accordance with this invention is described with reference to FIGS. 9-11. The mounting bracket assembly 210 includes a base 212 supporting a U-shaped bracket element 16 to which is pivotably attached (not shown) an object to be mounted as described above. A clamp plate 214 holds the U-shaped bracket 16 against the base 212 by means of bolts 260. Screws 278 hold the base 212 to a curved pole 218.

The base 212 includes a curved vertical plate 80 having offset mounting flanges 82 at top and bottom for passage therethrough of the screws 278. The offset in the mounting flanges 82 prevents the vertical curved plate 80 from making contact with the post 218. A pair of hooks 84 extend from the vertical plate 80 adjoining the lateral edges 86 thereof. The hooks open upwardly for receiving the U-shaped bracket element 16. The curvature of the curved plate 80 coincides with the curvature of the U-shaped bracket element 16 so that a rigid continuous support is provided. The base 212 can be formed, for example, as an integral metal stamping.

A clamp plate 214 has a curved inner surface 86 which corresponds with the curvature of the U-shaped bracket element 16. Bolts 260 pass through clearance holes in the clamp plate 214 and engage in threaded receptacles 88 integrally attached to the rear surface of the curved plate 80. When the base 212 is fabricated of metal, the threaded receptacles 88 are weld nuts.

In summary, a mounting bracket assembly in accordance with this invention is used by first attaching the base 12, 112, 212 to the vertical post or wall by means of bolts, screws, a strap, or a combination thereof. Then the U-shaped bracket element 16, attached to the object to be mounted is inserted within the confines of the hooked elements which are an integral part of the base. In this condition, the object to be mounted, for example, a loudspeaker, a lighting fixture, has its weight entirely supported by the base. The person making the installation may then pivot the supported object vertically and lock it at any selected position. Also the U-shaped bracket element 16 may be rotated while retained by the hook elements such that a lateral aiming of the mounted object can be selected. Finally, the clamp plate 14, 114, 214 is placed with its curved surface in contact with the curved surface of the U-shaped bracket element 16 and is attached firmly to the base by means of screws or bolts as appropriate to the particular embodiment. When the clamp plate 14, 114, 214 is locked in place, the U-shaped bracket element 16 is also firmly positioned relative to the base and has no freedom to move upwardly, downwardly or by sliding through the hooked elements. Thus a person making an installation is free to perform all final adjustments on the mounted object before fixing the position without any necessity to bear the weight of the mounted object.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A mounting bracket assembly for adjustably supporting an object comprising:

a base, said base having two hooked portions extending from one face thereof, said two hooked portions being vertically displaced and opposed to each other to form a C-shape with said base, said base including an opening in said one face, said opening diverging away from said one face, said opening being partially obstructed by said vertically displaced hooked portions, the distance between said opposed hooked portions enlarging towards said one face of said base, the opposed face of said upper hooked element being substantially perpendicular to said one face;

means for fixedly attaching said base to a mounting surface;

a bracket, said bracket including means for attachment to said supported object, a curved segment, a portion of said curved segment being slidably constrained between said two hooked portions and said one face of said base, said opening in said one face providing clearance with said curved segment, said curved segment when tilted being adapted to pass between said opposed hook portions to be constrained between said base and said hook portions, said curved segment when not tilted being unable to pass between said opposed hooked portions;

clamping means, said clamping means being removably attached to said base and, adjustably urging said curved segment against at least a portion of said one face of said base such that relative motion between said base, said curved segment and said two hooked portions is prevented, said clamping means including a curved surface, said curved surface mating with said curved segment, said curved segment being sandwiched between said base and said clamping means, said clamping means including an opening, said two hooked portions extending through said opening in said clamping means, said supported object being constrained from separation from said base by said hooked elements and supported without said urging into a fixed position by said clamping means, said curved segment being slidable while constrained from separation until said clamping means is adjusted to fix the relative positions of said base and said curved segment.

2. A mounting bracket assembly as claimed in claim 1, wherein said supported object is adjustably pivotably attached to said bracket by said means for attachment, the pivoting axis of said supported object being transverse to the axis of rotation of said curved segment sliding between said base and said two hooked portions.

* * * * *